Patented Apr. 12, 1949

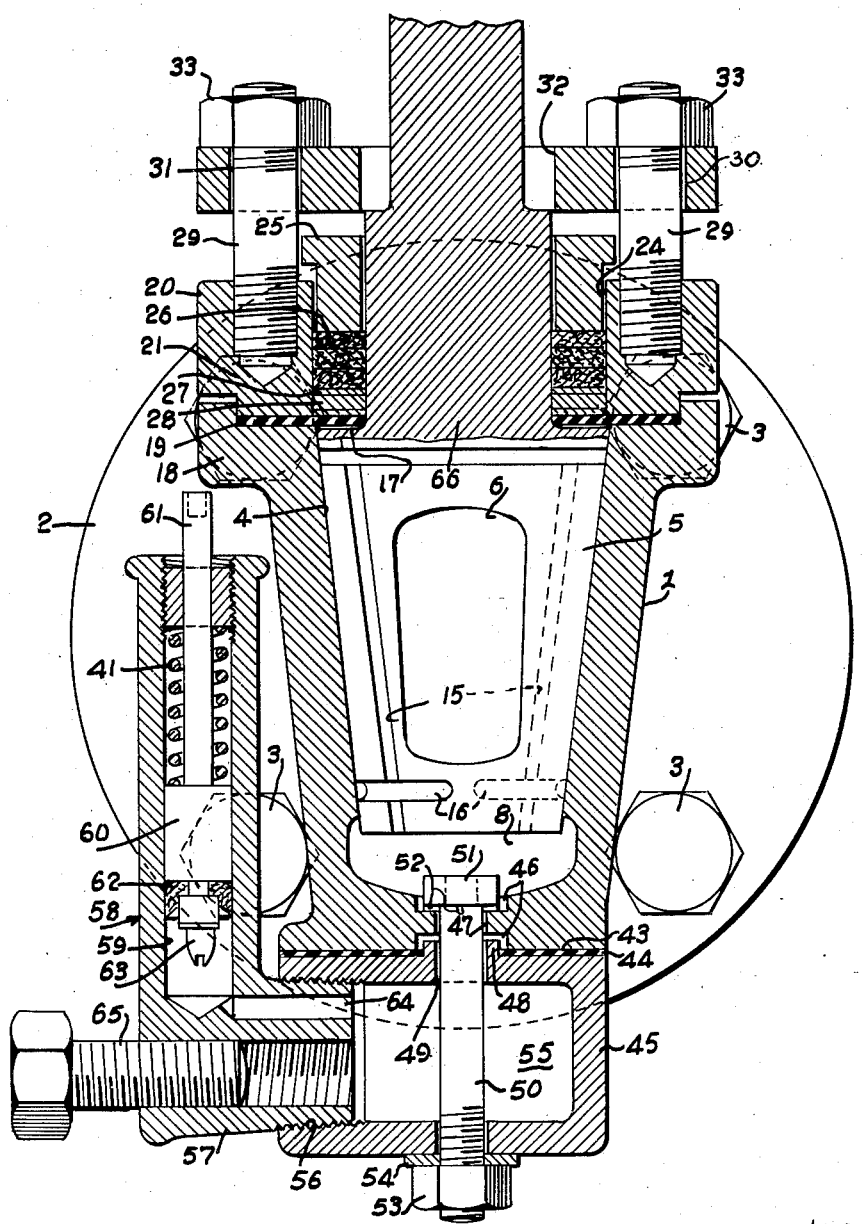

2,467,313

UNITED STATES PATENT OFFICE 2,467,313

VALVE

Oystein Jacobsen, Dayton, Ohio, assignor to The Duriron Company, Inc., Dayton, Ohio, a corporation of New York Original application November 24, 1943, Serial No. 511,519. Divided and this application November 3, 1945, Serial No. 626,475

1 Claim. (Cl. 251—93)

The present invention relates to valves for controlling the flow of liquids and more particularly to those valves of the plug cock type.

This application is a division of my application Serial No. 511,519, filed November 24, 1943 and entitled "Valve."

It is customary in valves of this character to employ a lubricating system by which the lubricant is applied to the bearing surfaces at the valve seat. The lubricant is usually contained in a reservoir and is subjected to pressure by a set screw or other suitable device to force the lubricant through passageways that are provided in the plug and/or in the coupling body at the position of the valve seat. These passageways usually take the form of grooves which extend diametrally around the plug and interconnect with grooves that extend longitudinally of the plug and terminate in the lubricant reservoir. In certain cases grooves are also provided in the valve body to cooperate with the lubricating effect offered by the grooves in the plug.

This method of lubricating a plug cock valve is in general satisfactory but it has been found on occasion that the pressure momentarily applied to the lubricant by the set screw does not serve continually to keep the grooves or passageways filled with grease. It will be understood in this connection that these grooves sometimes are exposed to the liquid flowing through the valve which tends to use up the lubricant and in addition, there is a certain amount of leakage between the plug and its seat when the valve is being operated between its closed and open positions and all of these conditions tend to reduce and eventually completely to dissipate the pressure initially applied to the lubricant in its reservoir.

The primary object of the present invention is to provide an improved valve of the plug cock type in which lubricant is continuously supplied to the lubricating grooves or passageways at all times and even when the set screw which initially places the lubricant under pressure is not operated.

Another object is to provide a valve of the type referred to and in which a continuous pressure is applied to the lubricant regardless of leakage of the lubricant and the normal loss of pressure caused thereby.

A more general object is to provide a valve of the plug cock type in which an improved structure and arrangement is employed for assuring a constant supply of lubricant to the bearing surfaces between the plug and the valve seat.

These objects are attained in brief by adding to the lubricating system a structure which in effect constitutes a continuous source of pressure and which is set into action when pressure is initially applied to the lubricant.

The invention will be better understood when reference is made to the following description and the accompanying drawing, in which:

The figure is a vertical section of the improved valve in its valve-open position but with some of the parts in elevation.

The valve casing 1 may be fabricated of a metal such as high silicon iron which is not attackable by acids but is practically unmachinable. The valve casing or casting terminates at each end in a coupling flange 2 provided with bolts 3 for securing the valve between the separated ends of a pair of conduits through which the liquid to be controlled passes. The valve casting is provided with a conically shaped opening 4 which extends at right angles to the main openings through the conduits and is adapted rotatable to receive the plug portion 5 of the valve. This plug is provided with a transversely extending opening 6, the arrangement being such that when this opening is in line with the openings in the conduits, the valve is at open position. The casting is terminated by a flat surface indicated at 43 against which is placed a gasket 44 and a lubricant reservoir or compartment member 45 is secured in any suitable manner to the casting 1. The compartment member 45 may be made of an easily machinable metal because it does not come in contact with the acid.

A convenient way of securing the reservoir 45 to the casting 1 is illustrated. The latter is provided with a pair of counterbored openings 46 extending from opposite sides of the casting and joined together by a centrally disposed opening 47. The upper surface of the compartment member 45 is shouldered as indicated at 48 and the shoulder portion fits into the adjacent counterbore opening 46 for centering purposes. An opening 49 is provided through the upper wall of the compartment member in line with the openings 46 and 47. A similar opening is provided in the lower wall of the compartment member. A bolt 50 loosely extends through the openings 47 and 49, the head 51 of the bolt being provided with spacing ribs 52 which prevent the bolt head from contacting the lower flat surface of the upper counterbore opening 46. The bolt is provided with a threaded end at the bottom for receiving a nut 53 and a washer 54. The arrangement is such that as the nut is tightened the ribs 52 bear against the flat portion of the upper counterbored opening 46 to secure the compartment member 45 to the valve casting 1. Inasmuch as there is a small annular space between the shank of the bolt 50 and the immediately surrounding openings, any lubricant within the reservoir 55 finds its way past the bolt and out through the spaces formed by the ribs 52 into the chamber 8 and from thence through the grooves 15, 16 and 17 to the valve seat.

The compartment 45 is completely closed except for a large threaded opening indicated at 56 which is adapted to receive the threads of a pipe element 57 which has a right angle extension 58. This extension is provided with a bore 59 containing a plunger 60 and a plunger rod 61. A suction diaphragm 62 may be secured to the lower end of the plunger by means of a screw 63. The bore 59 communicates with the reservoir 55 through a horizontal opening 64.

In order to apply pressure to the lubricant in the reservoir 55, a set screw arrangement 65 may be provided. The structure shown in the figure offers the advantage over other valve structures in that it may be applied to a valve mechanism in which the valve body 1 may be made of a non-machinable metal such as silicon iron so as to resist acid. The machinable elements 62 and 45 may be detachably secured to the casing 1 by means of the bolt 50.

The plug 5 is provided with a pair of oppositely disposed longitudinally extending grooves 15. In addition, there may be provided a pair of oppositely disposed arcuate grooves 16 at the bottom of the plug equidistantly on each side of the grooves 15. A circumferential groove 17 may also be provided at the top of the plug which serves to interconnect the longitudinal grooves 15 so that the peripheral surface of the plug 5 is well covered with grooves or passageways through which a lubricant can be forced out of the reservoir 55 when the set screw 65 is turned.

The upper end of the valve casting 1 terminates at the top of a shouldered flange 17, this flange being positioned at about the same height as the upper surface of the plug 5. A gasket 19 of leather or rubber may be positioned within the shouldered flange to prevent leakage of fluid at the joint. A metal ring 20 having a shoulder extension 21 rests on the gasket 19. This ring and the flange member 18 may be bolted together in any suitable manner, i. e., each element may be provided with oppositely disposed horizontally positioned wings which are bolted together (not shown) as is well-known in the art. The plug 5 terminates at its upper end in a shouldered stem portion 66, the diameter of which is considerably less than the internal diameter of the ring 20 so as to leave an annular space, indicated at 24.

There is a gland member 25 loosely fitted within this annular space and resting on a plurality of layers of packing material 26. This material may be supported on a washer 27 which in turn rests on a leveling washer 28. The arrangement is such that when the gland member 25 is pressed downwardly in a manner which will be explained shortly the packing material 26 is compressed accordingly in the vertical direction but caused to expand in the horizontal direction and thereby reduce leakage between the shaft 22 and the ring 20. It will be noted that the leveling washer 28 is carried on the inner peripheral portion of the gasket 19. The ring 20 is provided with a plurality of equidistantly spaced threaded openings for receiving thread studs 29 which pass loosely through openings 30 in a ring 31 positioned directly above the ring 20. The ring 31 has a width in the radial direction sufficiently large to extend over the upper surface of the gland member 25 but the internal opening 32 in the ring 31 is sufficiently large as readily to clear the shaft portion 22. Thus, by tightening the nuts 33 the ring 31 may be caused to move downwardly and apply pressure to the upper surface of the gland member 25 and in this manner to apply corresponding pressure to the packing material 26.

It has been found as a matter of fact that prior to my invention, the most susceptible place for a dry bearing surface is along the narrow peripheral band at the upper portion of the plug 5 and positioned between the groove 17 and the shoulder, indicated at 17, of the plug. This peripheral band is lubricated only for an instant after the set screw 65 has been turned because the slightest leakage of pressure in the lubricant tends to prevent the latter from reaching this particular area of the plug. However, since employing a device such as the piston 60 for applying a steady pressure over long periods of time to the lubricant after the set screw 65 has been turned, it has been found that there are no dry areas anywhere on the plug, including the peripheral band referred to at the top of the plug. It will be noted that notwithstanding the fact that the plunger 60 is caused to move upwardly by the pressure exerted at the set screw 65, the turning at the set screw is not greatly increased. Furthermore, that type of plug in which a lifting effect immediately prior to rotation is obtained by applying increased pressure to the lubricant is not affected by the plunger accessory because the increased pressure for plug lifting purposes is still available at the set screw 65.

By extending the plunger rod 61 above the upper surface of the extension 58, the external portion of the rod can serve as a visual indicator as to the amount of lubricant that is positioned directly below the plunger so as to determine whether or not the lubricating system needs refilling by additional turns of the set screw 65.

It will be understood that I desire to comprehend within my invention such modifications as come within the scope of the claim and the invention.

Having thus fully described my invention, what I claim as new and desire to secure by Letters Patent, is:

In a plug cock valve a casing open at both ends, and having a tapering valve seat and a lubricant chamber communicating with the smaller end of said seat, a complemental tapered plug in said seat, said casing having a bottom wall defining the bottom of said chamber, and formed with an opening, a compartment member engaging said bottom wall and having openings in alignment with the opening in the bottom of said casing, a bolt passing through said aligned openings, a head on said bolt, means on said head providing a passageway between said head and said casing wall adjacent to said opening therein, said bolt having a diametrical dimension smaller than said openings whereby clearance thereabout is provided, a nut on the other end of said bolt engaging said compartment member, a pipe element screw threadedly engaging said compartment member, said pipe element having a plurality of bores in communication with the interior of said compartment member, one of said bores being provided with threads and a set screw engaging said threads, an extension on said pipe member having a cylinder, a spring pressed plunger in said cylinder, said cylinder being in direct communication with another of said pipe element bores, whereby said set screw and plunger may be removable as a unit from said compartment member.

OYSTEIN JACOBSEN.

REFERENCES CITED

The following references are of record in the file of this patent:

UNITED STATES PATENTS

| Number | Name | Date |
| --- | --- | --- |
| 2,048,384 | Jacobsen | July 21, 1936 |
| 2,281,697 | Kerr | May 5, 1942 |

FOREIGN PATENTS

| Number | Country | Date |
| --- | --- | --- |
| 281,893 | Great Britain | Dec. 15, 1927 |
| 499,703 | Great Britain | Jan. 27, 1939 |